(12) United States Patent
Edwards et al.

(10) Patent No.: US 7,238,770 B2
(45) Date of Patent: Jul. 3, 2007

(54) METHODS OF MAKING IMIDE-MODIFIED POLYESTER RESINS

(75) Inventors: Walter L. Edwards, Harrisburg, NC (US); Marion L. Andrews, Darlington, SC (US)

(73) Assignee: Wellman, Inc., Fort Mill, SC (US)

( * ) Notice: Subject to any disclaimer, the term of this patent is extended or adjusted under 35 U.S.C. 154(b) by 0 days.

(21) Appl. No.: 11/046,481

(22) Filed: Jan. 28, 2005

(65) Prior Publication Data

US 2005/0171326 A1  Aug. 4, 2005

Related U.S. Application Data

(60) Provisional application No. 60/645,978, filed on Jan. 22, 2005, provisional application No. 60/540,520, filed on Jan. 29, 2004.

(51) Int. Cl.
- *C08G 63/00* (2006.01)
- *C08G 63/183* (2006.01)
- *C08G 63/685* (2006.01)
- *C08G 73/00* (2006.01)

(52) U.S. Cl. .................. 528/288; 528/296; 528/300; 528/301; 528/302; 528/307; 528/308; 528/308.6; 528/310; 528/403; 528/422; 525/473; 525/440

(58) Field of Classification Search ............... 528/288, 528/296, 300, 301, 302, 307, 308, 308.6, 528/310, 403, 422, 433; 525/437, 440; 428/35.7, 428/221, 364
See application file for complete search history.

(56) References Cited

U.S. PATENT DOCUMENTS

| | | | |
|---|---|---|---|
| 3,060,191 A | 10/1962 | Kolb et al. | |
| 3,975,330 A | 8/1976 | Suzuki et al. | |
| 3,996,201 A | 12/1976 | Buxbaum et al. | |
| 4,245,086 A | 1/1981 | Uno et al. | |
| 4,605,728 A * | 8/1986 | Tung ............................ | 528/289 |
| 4,749,775 A * | 6/1988 | Takeya et al. ............... | 528/289 |
| 4,910,290 A * | 3/1990 | Tung et al. .................. | 528/272 |
| 5,102,978 A * | 4/1992 | Richard, Jr. ................. | 528/272 |
| 5,182,392 A | 1/1993 | Tanisake et al. | |
| 5,898,058 A | 4/1999 | Nichols et al. | |
| 6,291,066 B1 | 9/2001 | Branum | |
| 6,303,739 B2 | 10/2001 | Branum | |
| 6,309,718 B1 | 10/2001 | Sprayberry | |
| 6,322,886 B2 | 11/2001 | Branum | |
| 6,399,705 B2 | 6/2002 | Branum | |
| 6,454,982 B1 | 9/2002 | Branum | |
| 6,500,890 B2 | 12/2002 | Edwards et al. | |
| 6,509,091 B2 | 1/2003 | Branum et al. | |
| 6,569,991 B2 | 5/2003 | Nichols et al. | |
| 6,573,359 B2 | 6/2003 | Nichols et al. | |
| 6,582,817 B2 | 6/2003 | Carnes et al. | |
| 6,590,069 B2 | 7/2003 | Nichols et al. | |
| 6,599,596 B2 | 7/2003 | Nichols et al. | |
| 6,623,853 B2 | 9/2003 | Branum et al. | |
| 6,710,158 B2 | 3/2004 | Edwards et al. | |
| 6,727,306 B2 | 4/2004 | Edwards et al. | |
| 6,803,082 B2 | 10/2004 | Nichols et al. | |
| 2007/0027292 A1 | 2/2007 | Pretzer et al. | |

FOREIGN PATENT DOCUMENTS

| | | |
|---|---|---|
| DE | 2659092 | 7/1977 |
| EP | 0 252 415 | 1/1988 |
| JP | 11-228695 | 8/1999 |
| WO | WO2007014309 | 2/2007 |

OTHER PUBLICATIONS

V.S. Kishanprasad and P.H. Gedam, "Synthesis and Characterization of Polyester-Imides from Imidodicarboxylic Acid Monomers and Ethylene Glycol", Journal of Applied Polymer Science, 1993, pp. 1151-1162, vol. 48, John Wiley & Sons, India.
"Measuring Loose Powder Using the LabScan XE", http://www.hunterlab.com/measurementmethods/powder.html.
"Measuring Pressed Powder Plaques Using the LabScan XE", http://www.hunterlab.com/measurementmethods/plaques.html.
Heesub Kim et al.; Phase behavior of poly (pyromellitimide)s having flexible (n-alkyloxy) methyl side chains; Pohang; San 31; 790-784; 2000; Korea.
International Search Report for International Patent Application No. PCT/US2005/003149 dated May 18, 2005.
International Preliminary Report on Patentability dated Apr. 4, 2006 for International Application PCT/US2005/003149.

* cited by examiner

*Primary Examiner*—Irina S. Zemel
(74) *Attorney, Agent, or Firm*—Summa, Allan & Additon, P.A.

(57) ABSTRACT

The present invention relates to methods of making imide-modified polyester imide resins. The present invention further relates to forming these imide-modified polyester imide resins into articles, such as preforms, bottles, containers, sheets, films, fibers, and injection molded parts.

75 Claims, No Drawings

METHODS OF MAKING IMIDE-MODIFIED POLYESTER RESINS

CROSS-REFERENCE TO PRIORITY APPLICATIONS

This application hereby claims the benefit of the following commonly assigned provisional patent applications: U.S. Provisional Patent Application Ser. No. 60/540,520, for Methods of Making Copolyester Imide Resins, filed Jan. 29, 2004; and U.S. Provisional Patent Application Ser. No. 60/645,978, for Imide-Modified Polymer Resins and Methods of Making the Same, tiled Jan. 22, 2005. This application incorporates entirely by reference these provisional applications.

CROSS-REFERENCE TO COMMONLY ASSIGNED APPLICATIONS

This application also incorporates entirely by reference the following commonly assigned patents: U.S. Pat. No. 6,599,596, for Methods of Post-Polymerization Injection in Continuous Polyethylene Terephthalate Production; U.S. Pat. No. 6,590,069, for Methods of Post-Polymerization Extruder Injection in Condensation Polymer Production; U.S. Pat. No. 6,573,359, for Methods of Post-Polymerization Injection in Condensation Polymer Production; U.S. Pat. No. 6,569,991, for Methods of Post-Polymerization Extruder Injection in Polyethylene Terephthalate Production; U.S. Pat. No. 6,500,890, for Polyester Bottle Resins Having Reduced Frictional Properties and Methods for Making the Same; U.S. Pat. No. 6,710,158 for Methods for Making Polyester Bottle Resins Having Reduced Frictional Properties; U.S. Pat. No. 6,727,306 for Polymer Resins Having Reduced Frictional Properties; and U.S. Pat. No. 6,803,082, for Methods for the Late Introduction of Additives into Polyethylene Terephthalate.

This application further incorporates entirely by reference the following commonly assigned patent applications: U.S. Provisional Patent Application Ser. No. 60/472,309, for Titanium-Catalyzed Polyester Resins, Preforms, and Bottles, filed May 21, 2003; U.S. Provisional Patent Application Ser. No. 60/540,520, for Methods of Making Copolyester Imide Resins, filed Jan. 29, 2004; U.S. Provisional Patent Application Ser. No. 60/559,983, for Titanium-Catalyzed Polyester Resins, Preforms, and Bottles, filed Apr. 6, 2004; U.S. patent application Ser. No. 10/850,269, for Methods of Making Titanium-Catalyzed Polyester Resins, filed May 20, 2004; U.S. Provisional Patent Application Ser. No. 60/573,024, for Slow-Crystallizing Polyester Resins and Polyester Preforms Having Improved Reheating Profile, filed May 20, 2004; U.S. patent application Ser. No. 10/850,918, for Slow-Crystallizing Polyester Resins, filed May 21, 2004; U.S. patent application Ser. No. 10/962,167, for Methods for Introducing Additives into Polyethylene Terephthalate, filed Oct. 8, 2004; and U.S. patent application Ser. No. 10/996,789, for Polyester Preforms Useful For Enhanced Heat-Set Bottles, filed Nov. 24, 2004.

This application further incorporates entirely by reference international patent application No. PCT/US2005/03149, for Imide-Modified Polyester Resins and Methods of Making the Same, concurrently filed Jan. 28, 2005.

FIELD OF THE INVENTION

The present invention relates to imide-modified condensation polymers, particularly imide-modified polyethylene terephthalate. The invention also relates to methods of forming imide-modified polyethylene terephthalate, such as by reacting polyethylene terephthalate precursors with pre-esterified aromatic heterocyclic imide.

BACKGROUND OF THE INVENTION

Because of their strength, heat resistance, and chemical resistance, polyester containers, films, and fibers are an integral component in numerous consumer products manufactured worldwide. In this regard, most commercial polyester used for polyester containers, films, and fibers is polyethylene terephthalate polyester.

Polyester resins, especially polyethylene terephthalate and its copolyesters, are also widely used to produce rigid packaging, such as two-liter soft drink containers. Polyester packages produced by stretch-blow molding possess outstanding strength, clarity, and shatter resistance, and have excellent gas barrier and organoleptic properties as well. Consequently, such lightweight plastics have virtually replaced glass in packaging numerous consumer products (e.g., carbonated soft drinks, fruit juices, and peanut butter).

Despite these recognized advantages, conventional polyethylene terephthalate resins are often unsuitable for applications requiring thermal stability, such as for automobile interiors or for outdoor applications requiring exposure to summer temperatures. Moreover, conventional polyethylene terephthalate resins do not hold up well during high temperature washings (i.e., near 100° C.).

In this regard, polycarbonate is a preferred polymeric material for it possesses not only an elevated glass transition temperature ($T_G$) of about 150° C., but also exceptional impact strength. Accordingly, polycarbonate is frequently employed in higher temperature applications. Polycarbonate is also used as an unbreakable glass substitute in windows and eyewear lenses. Thermoplastic polycarbonate is available, for example, under the trade name LEXAN® (GE Plastics).

Similarly, polymethyl methacrylate (PMMA), an acrylic, possesses a glass transition temperature ($T_G$) of about 105° C., which imparts respectable heat bearing capability. PMMA also has excellent clarity. Although PMMA possesses lesser impact resistance as compared with polycarbonate, it is less costly and is often used as a glass substitute, such as in windows and signs. PMMA is available, for example, under the trade names PLEXIGLAS® (Elf Atochem) and LUCITE® (Ineos Acrylics).

Polyester having satisfactory properties could provide a cost-effective alternative to polycarbonate and PMMA in many applications. In this regard, there is a need for polyethylene terephthalate resin that retains—and perhaps even improves upon—the strength and durability of conventional polyesters, yet provides improved thermal stability.

SUMMARY OF THE INVENTION

Accordingly, it is an object of the present invention to provide imide-modified polyester resins having improved thermal stability. As compared with conventional homopolyesters and copolyesters, such imide-modified polyester resins possess higher glass transition temperatures.

It is a further object of the present invention to provide imide-modified polyester resins having improved barrier properties.

It is a further object of the present invention to provide imide-modified polyester resins having improved impact resistance.

It is a further object of the present invention to provide imide-modified polyester resins having excellent color characteristics.

It is a further object of the present invention to provide imide-modified polyester resins having excellent clarity characteristics.

It is a further object of the present invention to provide imide-modified polyester resins that can be used to make preforms and containers (e.g., beverage bottles).

It is a further object of the present invention to provide imide-modified polyester resins that can be used to make oriented and unoriented sheets and films.

It is a further object of the present invention to provide imide-modified polyester resins that can be used to make fibers possessing heat-bearing capability.

It is a further object of the present invention to provide imide-modified polyester resins that can be used to make injection-molded parts.

It is a further object of the present invention to provide imide-modified polyester resins that can be used to make optical media, such as DVDs and CDs.

It is a further object of the present invention to provide methods for modifying polyethylene terephthalate with aromatic heterocyclic imides.

It is a further object of the present invention to provide methods that facilitate the reaction of aromatic heterocyclic imides and polyethylene terephthalate oligomers.

It is a further object of the present invention to provide condensation polymer resins that include aromatic heterocyclic imide substitution.

It is a further object of the present invention to provide methods for modifying condensation polymers with aromatic heterocyclic imides.

The foregoing, as well as other objectives and advantages of the invention and the manner in which the same are accomplished, is further specified within the following detailed description.

DETAILED DESCRIPTION

The invention relates to imide-modified condensation polymers. As polyesters—especially polyethylene terephthalate—are the preferred condensation polymers, the present invention is herein described with particular reference to polyethylene terephthalate. In this regard, it is expected that those of ordinary skill in the polymer arts will understand that the following description of the invention is directed not only to the imide modification of polyethylene terephthalate, but also to the imide modification of any condensation polymer having carbonyl functionality.

Accordingly, in one aspect the invention is an imide-modified polyester resin possessing excellent thermal stability, impact resistance, and barrier properties. The imide-modified polyester resin is especially useful in containers, packaging, sheets, films, fibers, and injection molded parts.

In this regard, the invention embraces imide-modified polyethylene terephthalate polymer resins that are composed of about a 1:1 molar ratio of a terephthalate component and a diol component (i.e., a terephthalate moiety and a diol moiety). The terephthalate component is typically either a diacid component, which includes mostly terephthalic acid, or a diester component, which includes mostly dimethyl terephthalate. The diol component comprises mostly ethylene glycol.

The terephthalate component preferably includes more than about 2 mole percent aromatic heterocyclic imide (e.g., between about 3 and 20 mole percent), preferably more than about 5 mole percent aromatic heterocyclic imide (e.g., between about 5 and 15 mole percent), and most preferably more than about 10 mole percent aromatic heterocyclic imide (e.g., between about 10 and 20 mole percent). The terephthalate component typically includes less than about 30 mole percent aromatic heterocyclic imide.

In one embodiment, such polyethylene terephthalate copolymers are composed of about a 1:1 molar ratio of a diacid component and a diol component, wherein the diacid component includes aromatic heterocyclic imide, but mostly terephthalic acid (e.g., 70–85 mole percent; 80–95 mole percent; or 90–98 mole percent).

In another embodiment, such polyethylene terephthalate copolymers are composed of about a 1:1 molar ratio of a diester component and a diol component, wherein the diester component includes aromatic heterocyclic imide, but mostly dimethyl terephthalate (e.g., 70–85 mole percent; 80–95 mole percent; or 90–98 mole percent).

In either embodiment, the diol component includes mostly ethylene glycol (e.g., 90 mole percent or more).

The imide-modified polyethylene terephthalate polymers possess a glass transition temperature ($T_G$) of greater than about 80° C., preferably greater than about 85° C., and more preferably greater than about 90° C. (e.g., between about 95° C. and 110° C.), as measured by differential scanning calorimetry at a heating rate of 10° C. per minute. Such elevated glass transition temperatures make these polyesters a lower-cost alternative to polycarbonate and PMMA.

Those having ordinary skill in the art understand that, for many applications (e.g., preforms and bottles), polyethylene terephthalate resins must possess excellent color (i.e., not too dark or yellow). In contrast to prior imide-containing polyesters, the imide-modified polyethylene terephthalate polymers of the present invention possess excellent color characteristics.

Color differences are commonly classified according to the L*a*b* color space of the Commission Internationale l'Eclairage (CIE). The three components of this system consist of L*, which describes luminosity on a scale of 0–100 (i.e., 0 is black and 100 is white), a*, which describes the red-green axis (i.e., positive values are red and negative values are green), and b*, which describes the yellow-blue axis (i.e., positive values are yellow and negative values are blue). For characterizing polyester resins, L* and b* values are of particular interest.

In particular, as classified by the CIE L*a*b* color space, the present imide-modified polyethylene terephthalate polymers possess an amorphous L* value (i.e., luminosity) of more than about 55 and an amorphous b* color value of less than about 5. Indeed, the imide-modified polyethylene terephthalate polymers typically possess an amorphous L* value of more than about 60 and preferably possess an amorphous L* value of more than about 70 (e.g., more than about 75 or 80). Moreover, the imide-modified polyethylene terephthalate polymers preferably possess an amorphous b* color value of less than about 3 (e.g., less than about 2). In this regard, the amorphous b* color value is evaluated for uncolored resins (i.e., not including colorants).

Those having ordinary skill in the art will understand that polymer processing often affects color. For example, the luminosity of polyethylene terephthalate increases upon solid state polymerization. Thus, as used herein, the terms "amorphous L* value" and "amorphous b* color value" refer to measurements based on amorphous resin. The CIE L*a*b* color space values for these amorphous polyethylene terephthalate resins were determined using a HunterLab LabScan XE spectrophotometer.

Moreover, unless otherwise indicated (e.g., such as with respect to polyester test plaques), the CIE L*a*b* color space values reported herein for the polyethylene terephthalate resins of the present invention relate to ground, amorphous resin (i.e., "amorphous L* value" and "amorphous b* color value").

The polyethylene terephthalate resins of the present invention can be injection molded into articles, such as preforms. Preforms in turn may be blow molded into bottles. Measuring color in preforms and bottles, however, can be awkward. It is thus suggested that preforms and bottles be formed into standard test plaques to facilitate comparative color measurements. In this regard, imide-modified polyethylene terephthalate articles according to the present invention (e.g., preforms and bottles) may be ground, melted at 280° C., and then injected into a cold mold to form standard, three-millimeter (3 mm) non-crystalline polyester test plaques. Color measurements for such articles may then be conveniently measured on these standard test plaques.

If specifically noted, the CIE L*a*b* color space values for imide-modified polyethylene terephthalate articles of the present invention may be reported based on color measurements taken upon these standard test plaques. Such articles may include, without limitation, films, sheets, fibers, preforms, bottles, and even pellets. In this regard, CIE L*a*b* color space values for the three-millimeter, non-crystalline polyethylene terephthalate test plaques may be determined using a HunterLab LabScan XE spectrophotometer (illuminant/observer: D65/10°; diffuse 8° standard; transmittance port). Those having ordinary skill in the art will appreciate that non-crystalline polyester plaques are essentially transparent and so are typically measured by transmittance.

To the extent the standard test plaques are formed from, for example, polyester preforms, bottles, sheets, or films, the constituent polyesters may possess unfavorable heat histories. Those having ordinary skill in the art will appreciate that forming operations may somewhat degrade the constituent polyesters. For example, it has been observed that injection molding preforms from crystalline polyethylene terephthalate pellets (and thereafter forming standard test plaques) can introduce some yellowing (i.e., the b* color value increases slightly). On the other hand, as previously noted, the luminosity of polyethylene terephthalate typically increases upon solid state polymerization (i.e., the L* color value increases slightly).

Accordingly, imide-modified polyethylene terephthalate articles of the present invention (e.g., films, sheets, preforms, bottles, and crystalline pellets) ought to possess a L* value of more than about 55 (e.g., more than about 60) and a b* color value of less than about 6 (e.g., less than about 5) as classified by the CIE L*a*b* color space and as measured upon standard three-millimeter test plaques. It would be even more desirable for imide-modified polyethylene terephthalate articles of the present invention to possess a L* value of more than about 70 (e.g., more than about 75 or 80) and/or a b* color value of less than about 3 (e.g., less than about 2) as classified by the CIE L*a*b* color space and as measured upon standard three-millimeter test plaques. As reported herein, CIE L*a*b* color space values that are based upon color measurements taken upon these three-millimeter non-crystalline test plaques will be so identified.

Test procedures (e.g., standards and calibrations) appropriate for measuring color properties of polyester in various forms (e.g., ground, amorphous resin or non-crystalline test plaques) are readily available to and within the understanding of those having ordinary skill in the art. See http://www.hunterlab.com/measurementmethods.

In another aspect, the invention embraces a method for making imide-modified polyethylene terephthalate polymers. In this regard, the method includes reacting aromatic heterocyclic imide monomer and polyol under mild conditions to form esterified cyclic imide, and reacting a terephthalate component and a diol component to form polyethylene terephthalate precursors.

Those having ordinary skill in the art will appreciate that the step of reacting a terephthalate component and a diol component typically means reacting either a diacid component (e.g., mostly terephthalic acid) or a diester component (e.g., mostly dimethyl terephthalate) with ethylene glycol to form polyethylene terephthalate precursors. Prior to imide modification, these polyethylene terephthalate precursors typically include less than about 20 mole percent comonomer substitution (e.g., between about 5 and 15 mole percent comonomer), and preferably include less than about 10 mole percent comonomer substitution (e.g., between about 2 and 5 mole percent comonomer). Non-imide modification of the terephthalate and diol components via selective comonomer substitution is further discussed herein.

The esterified cyclic imide is introduced into the polyethylene terephthalate precursors. The esterified cyclic imide reacts with the polyethylene terephthalate precursors to yield imide-modified polyethylene terephthalate precursors. Thereafter, the imide-modified polyethylene terephthalate precursors are polymerized via melt phase polycondensation to form imide-modified polyethylene terephthalate polymers.

The melt phase polymerization typically continues until the imide-modified polyethylene terephthalate polymers achieve an intrinsic viscosity of between about 0.5 and 0.75 dl/g (e.g., 0.6–0.65 dl/g). Moreover, the method typically includes subsequent solid state polymerization of the imide-modified polyethylene terephthalate polymers to an intrinsic viscosity of between about 0.7 and 1.0 dl/g (e.g., 0.75–0.85 dl/g). Solid state polymerization typically proceeds at temperatures above about 190° C. (e.g., about 200° C. or more).

A significant advantage of the present invention over other processes is the pre-esterification of heterocyclic imide monomer prior to its introduction into the polyethylene terephthalate precursors. Without being bound to any theory, it is believed that reacting aromatic heterocyclic imide monomer and polyol under mild conditions: (1) facilitates the removal of unwanted color bodies that can exacerbate the color properties of resulting imide-modified polyethylene terephthalate polymers; (2) facilitates the late addition of the imide in a way that permits higher levels of imide modification to the polyethylene terephthalate polymers; and (3) minimizes the tendency of aromatic heterocyclic imide to undergo ring-opening reactions during subsequent polymer processing.

For example, the preparation of esterified cyclic imide typically occurs at about atmospheric pressure and less than about 200° C.—in some circumstances even less than about 180° C. (e.g., less than about 160° C., if practical). In contrast, the esterification reaction between the diacid component (e.g., terephthalic acid) and the diol component (e.g., ethylene glycol) can proceed at much higher temperatures (e.g., 260° C.) and pressures (40 psig).

In some circumstances, however, the preparation of esterified cyclic imide does not occur under mild conditions. Instead, the esterified cyclic imide is prepared at elevated pressures and temperatures to increase the solubility of the aromatic heterocyclic imide monomer in the polyol. For example, the reaction of aromatic heterocyclic imide monomer and polyol can proceed, if necessary, at greater than atmospheric pressure (e.g., 40 psig) and less than about 260° C. (e.g., between about 150° C. and 260° C.). This may be especially helpful when pre-esterifying high molecular weight imides.

In other circumstances, the formation of esterified cyclic imide is achieved by gradually introducing aromatic heterocyclic imide monomer into polyol. This technique is useful with respect to hard-to-esterify imides, such as the imide derived from m-xylene diamine (MXDA) and trimellitic anhydride (TMA).

With respect to the preparation of the esterified cyclic imide, the polyol preferably has the chemical formula R—(OH)$_n$, wherein R is a $C_2$–$C_{10}$ alkyl, a $C_6$–$C_{10}$ aryl, or a $C_8$–$C_{14}$ alkyl-substituted aryl, and wherein n is 2, 3, or 4. The polyol is typically an aliphatic diol, preferably ethylene glycol. Those having ordinary skill in the art will appreciate that a mixture of polyols may be used to prepare the esterified cyclic imide.

It is within the scope of invention to employ branching agent polyols, such as pentaerythritol, dipentaerythritol, trimethylol propane, ditrimethylol propane, ethoxylated glycerols, ethoxylated pentaerythritol, and ethoxylated trimethylol propane, and mixtures thereof. Those having ordinary skill in the art will appreciate that branching agents encourage cross-linking, which weakens polymer tensile and impact properties.

It is further within the scope of invention to employ polyether polyols or polyalkylene glycols, such as polyethylene glycol or polytetramethylene glycol. It is still further within the scope of invention to employ a mixture of two or more different kinds of polyols.

The aromatic heterocyclic imide is typically a derivative of trimellitic acid (TMLA) or trimellitic anhydride (TMA); a derivative of pyromellitic acid (PMLA) or pyromellitic dianhydride (PMDA); a derivative of benzophenone tetracarboxylic acid or benzophenone tetracarboxylic dianhydride; or a derivative of naphthalene tetracarboxylic acid or naphthalene tetracarboxylic dianhydride:

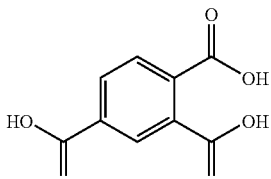

(trimellitic acid-TMLA)

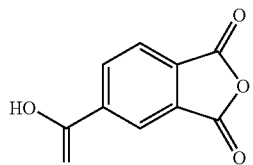

(trimellitic anhydride-TMA)

-continued

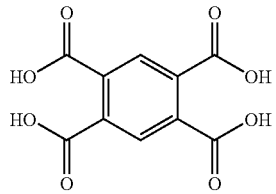

(pyromellitic acid-PMLA)

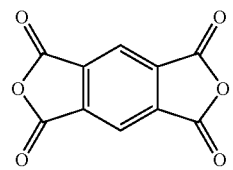

(pyromellitic dianhydride-PMDA)

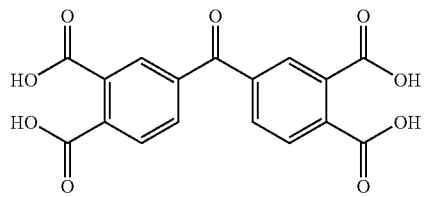

(benzophenone-3,3′,4,4′-tetracarboxylic acid)

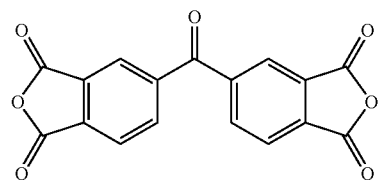

(benzophenone-3,3′,4,4′-tetracarboxylic dianhydride)

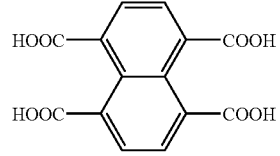

(1,4,5,8-naphthalene tetracarboxylic acid)

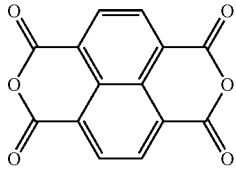

(1,4,5,8-naphthalene tetracarboxylic dianhydride)

Exemplary aromatic heterocyclic imides include hydroxyethyl trimellitimide (HETI); the m-xylene diamine (MXDA) imide of TMA; the 4,4'-diamino diphenyl methane (MDA) imide of TMA; the isophorone diamine (IPDA) imide of TMA; the ethylene diamine (EDA) imide of TMA; and the p-amino benzoic acid (PABA) imide of TMA. The corresponding structural formulae of these aromatic heterocyclic imides are represented as follows:

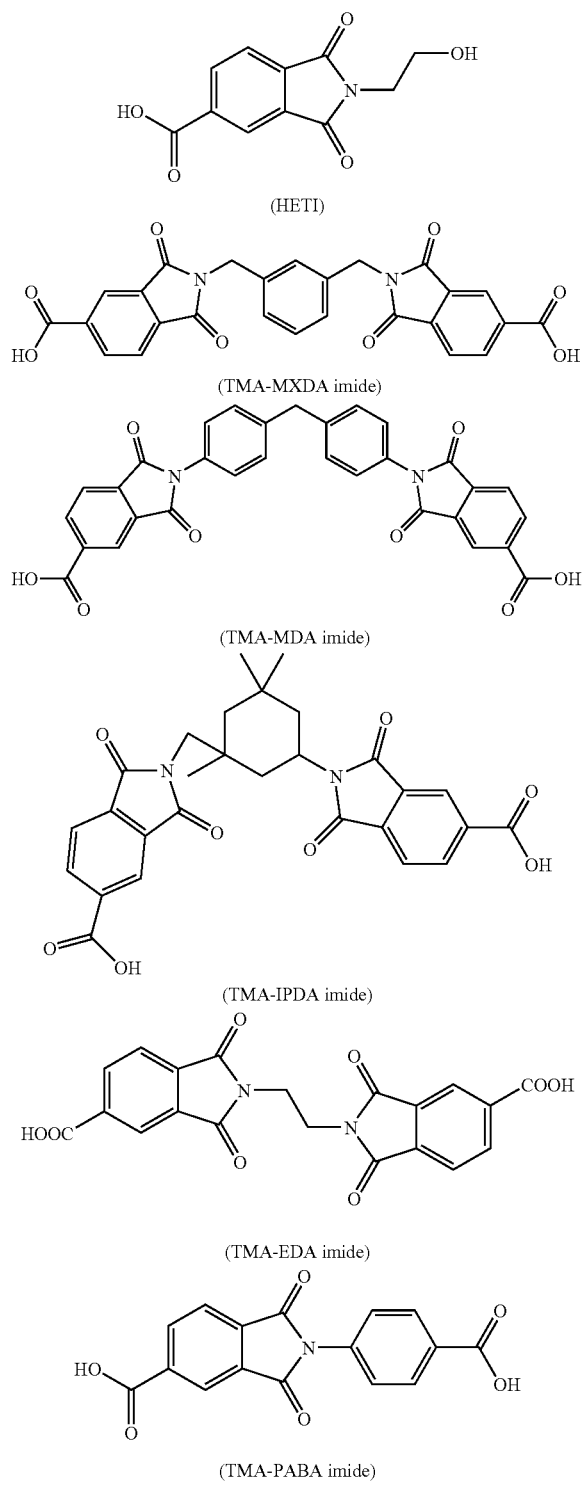

(HETI)

(TMA-MXDA imide)

(TMA-MDA imide)

(TMA-IPDA imide)

(TMA-EDA imide)

(TMA-PABA imide)

Except for HETI, which includes acid and alcohol functionality, these exemplary imides are diacids. HETI and IPDA, which are soluble in ethylene glycol, may be pre-esterified under somewhat milder conditions.

In forming the esterified cyclic imide, it is advantageous to react aromatic heterocyclic imide monomer with excess polyol. For example, the molar ratio of an aromatic heterocyclic imide monomer, such as HETI, to an aliphatic diol, such as ethylene glycol, should be at least about 1.00:1.05.

Surprisingly, it has been observed that employing an imide/diol molar ratio of at least about 1:2, and preferably 1:5 or greater (e.g., about 1:10), brings about appreciably better color properties in the resulting imide-modified polyethylene terephthalate polymers. When employing diol in such excess stoichiometric amounts, however, it is necessary to isolate and purify the esterified cyclic imide before introducing it into the polyethylene terephthalate precursors. To achieve this, the solution may be cooled, filtered, and centrifuged to thereby yield purified, solid esterified cyclic imide. It has been observed that the separated, excess diol is contaminated with color bodies.

Those skilled in the polymer arts will understand that the foregoing molar ratios must be stoichiometrically adjusted if branching agent polyols are employed. For example, pentaerythritol is a tetrafunctional branching agent that possesses four reactive sites—two additional reactive sites as compared with a diol, such as ethylene glycol. This application incorporates entirely by reference the following commonly assigned patents, each of which discusses stoichiometric molar ratios with respect to reactive end groups (i.e., "mole-equivalent branches"): U.S. Pat. No. 6,623,853, for Polyethylene Glycol Modified Polyester Fibers and Method for Making the Same; U.S. Pat. No. 6,582,817, for Nonwoven Fabrics Formed from Polyethylene Glycol Modified Polyester Fibers and Method for Making the Same; U.S. Pat. No. 6,509,091, for Polyethylene Glycol Modified Polyester Fibers; U.S. Pat. No. 6,454,982, for Method of Preparing Polyethylene Glycol Modified Polyester Filaments; U.S. Pat. No. 6,399,705, for Method of Preparing Polyethylene Glycol Modified Polyester Filaments; U.S. Pat. No. 6,322,886, for Nonwoven Fabrics Formed from Polyethylene Glycol Modified Polyester Fibers and Method for Making the Same; U.S. Pat. No. 6,303,739, for Method of Preparing Polyethylene Glycol Modified Polyester Filaments; and U.S. Pat. No. 6,291,066, for Polyethylene Glycol Modified Polyester Fibers and Method for Making the Same.

Those having ordinary skill in the art will appreciate that most commercial polyethylene terephthalate polymers are, in fact, modified polyethylene terephthalate polyesters. Indeed, the polyethylene terephthalate resins described herein are preferably modified polyethylene terephthalate polyesters. In this regard, the modifiers in the terephthalate component and the diol component are typically randomly substituted in the resulting polyester composition.

Those having ordinary skill in the art recognize that other kinds of additives can be incorporated into the imide-modified polyethylene terephthalate polymers of the present invention. Such additives include, without limitation, pre-form heat-up rate enhancers, friction-reducing additives, UV absorbers, inert particulate additives (e.g., clays or silicas), colorants, antioxidants, branching agents, oxygen barrier agents, carbon dioxide barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

As used herein, the term "comonomer" is intended to include monomeric and oligomeric modifiers (e.g., polyethylene glycol).

As used herein, the term "diol component" refers primarily to ethylene glycol, although other diols (e.g., diethylene glycol) may be used as well.

The term "terephthalate component" broadly refers to diacids and diesters that can be used to prepare polyethylene terephthalate. In particular, the terephthalate component mostly includes either terephthalic acid or dimethyl terephthalate, but can include diacid and diester comonomers as well. In other words, the "terephthalate component" is either a "diacid component" or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

The diol component can include diols besides ethylene glycol (e.g., diethylene glycol; polyalkylene glycols such as polyethylene glycol; 1,3-propane diol; 1,4-butane diol; 1,5-pentanediol; 1,6-hexanediol; propylene glycol; 1,4-cyclohexane dimethanol; neopentyl glycol; 2-methyl-1,3-propanediol; 2,2,4,4-tetramethyl-1,3-cyclobutanediol; adamantane-1,3-diol; 3,9-bis(1,1-dimethyl-2-hydroxyethyl)-2,4,8,10-tetraoxaspiro[5.5]undecane; and isosorbide).

Alternatively, the terephthalate component, in addition to terephthalic acid or its dialkyl ester (i.e., dimethyl terephthalate), can include modifiers such as isophthalic acid or its dialkyl ester (i.e., dimethyl isophthalate); 2,6-naphthalene dicarboxylic acid or its dialkyl ester (i.e., dimethyl 2,6 naphthalene dicarboxylate); adipic acid or its dialkyl ester (i.e., dimethyl adipate); succinic acid, its dialkyl ester (i.e., dimethyl succinate), or its anhydride (i.e., succinic anhydride); or one or more functional derivatives of terephthalic acid. Other exemplary diacid or diester comonomers modifiers include phthalic acid, phthalic anhydride, biphenyl dicarboxylic acid, cyclohexane dicarboxylic acid, anthracene dicarboxylic acid, adamantane 1,3-dicarboxylic acid, glutaric acid, sebacic acid, and azelaic acid.

In general, diacid comonomer should be employed when the terephthalate component is mostly terephthalic acid (i.e., a diacid component), and diester comonomer should be employed when the terephthalate component is mostly dimethyl terephthalate (i.e., a diester component).

It will be further understood by those having ordinary skill in the art that to achieve the polyester composition of the present invention a molar excess of the diol component is reacted with the terephthalate component (i.e., the diol component is present in excess of stoichiometric proportions).

In reacting a diacid component and a diol component via a direct esterification reaction, the molar ratio of the diacid component and the diol component is typically between about 1.0:1.0 and 1.0:1.6. Moreover, the diacid component typically includes at least 70 mole percent terephthalic acid, preferably at least 80 mole percent terephthalic acid, and more preferably at least 90 mole percent terephthalic acid (e.g., between about 90 and 98 mole percent terephthalic acid); the diol component typically includes at least 70 mole percent ethylene glycol, preferably at least 80 mole percent ethylene glycol, and more preferably at least 90 mole percent ethylene glycol (e.g., between about 90 and 98 mole percent ethylene glycol).

Alternatively, in reacting a diester component and a diol component via an ester interchange reaction, the molar ratio of the diester component and the diol component is typically greater than about 1.0:2.0. Moreover, the diester component typically includes at least 70 mole percent dimethyl terephthalate, preferably at least 80 mole percent dimethyl terephthalate, and more preferably at least 90 mole percent dimethyl terephthalate (e.g., between about 90 and 98 mole percent dimethyl terephthalate); the diol component typically includes at least 70 mole percent ethylene glycol, preferably at least 80 mole percent ethylene glycol, and more preferably at least 90 mole percent ethylene glycol (e.g., between about 90 and 98 mole percent ethylene glycol).

The diol component usually forms the majority of terminal ends of the polymer chains and so is present in the resulting polyester composition in slightly greater fractions. This is what is meant by the phrases "about a 1:1 molar ratio of a terephthalate component and a diol component," "about a 1:1 molar ratio of a diacid component and a diol component," and "about a 1:1 molar ratio of a diester component and a diol component," each of which is used herein to describe the polyester compositions of the present invention.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

Those having ordinary skill in the art will know that there are two conventional methods for forming polyethylene terephthalate. These methods are well known to those skilled in the art.

One method employs a direct esterification reaction using terephthalic acid and excess ethylene glycol. In this technique, the aforementioned step of reacting a terephthalate component and a diol component includes reacting terephthalic acid and ethylene glycol in a heated esterification reaction to form monomers and oligomers of (i) terephthalic acid and, optionally, diacid modifiers, and (ii) ethylene glycol and, optionally, diol modifiers. Water, as well, is formed as a byproduct.

To enable the esterification reaction to go essentially to completion, the water must be continuously removed as it is formed. The monomers and oligomers are subsequently catalytically polymerized via polycondensation to form polyethylene terephthalate polyester. During polycondensation, ethylene glycol is continuously removed to create favorable reaction kinetics.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated, catalyzed ester interchange reaction (i.e., transesterification) to form monomers of (i) dimethyl terephthalate and, optionally, diester modifiers, and (ii) ethylene glycol and, optionally, diol modifiers. Methanol, as well, is formed as a byproduct. In particular, dimethyl terephthalate and ethylene glycol yield bis(2-hydroxyethyl)-terephthalate monomers.

To enable the ester exchange reaction to go essentially to completion, methanol must be continuously removed as it is formed. The bis(2-hydroxyethyl) terephthalate intermediate monomer product is then catalytically polymerized via polycondensation to produce polyethylene terephthalate polymers. As noted, during polycondensation, ethylene glycol is continuously removed to create favorable reaction kinetics. The resulting polyethylene terephthalate polymers are substantially identical to the polyethylene terephthalate polymers resulting from direct esterification using terephthalic acid, albeit with some minor chemical differences.

As compared with the older, two-step ester exchange reaction, the direct esterification reaction is more economical and so is generally preferred.

Polyethylene terephthalate polyester may be produced in a batch process, where the product of the esterification or ester interchange reaction is formed in one vessel and then transferred to a second vessel for polymerization. The second vessel is agitated. Generally, the polymerization reaction is continued until the power used by the agitator reaches a level indicating that the polyester melt has achieved the desired intrinsic viscosity and, thus, the desired molecular weight. More commercially practicable, however, is to carry out the esterification or ester interchange reaction, and then the polymerization reaction, as a continuous process. The continuous production of polyethylene terephthalate results in greater throughput, and so is more typical in large-scale manufacturing facilities.

Those having ordinary skill in the art will appreciate that including catalysts increases the rates of esterification and polycondensation and, hence, the production of the polyethylene terephthalate resins. Catalysts, however, will eventually degrade the polyethylene terephthalate polymer. For example, degradation may include polymer discoloration (e.g., yellowing), acetaldehyde formation, or molecular weight reduction. To reduce these undesirable effects, stabilizing compounds can be employed to sequester ("cool") the catalysts. The most commonly used stabilizers contain phosphorus, typically in the form of phosphates and phosphites.

Certain problems associated with the addition of stabilizer are addressed in U.S. Pat. No. 5,898,058 for a Method of Post-Polymerization Stabilization of High Activity Catalysts in Continuous Polyethylene Terephthalate Production, which discloses a method of stabilizing high activity polymerization catalysts in continuous polyethylene terephthalate production. This patent, which is commonly assigned with this application, is hereby incorporated entirely herein by reference.

Moreover, the aforementioned U.S. Pat. No. 6,599,596 for Methods of Post-Polymerization Injection in Continuous Polyethylene Terephthalate Production, discloses a process for the production of high quality polyethylene terephthalate polyester that improves upon the stabilizer-addition techniques disclosed by commonly assigned U.S. Pat. No. 5,898,058.

In one embodiment, the method for making imide-modified polyethylene terephthalate polymers employs the aforementioned direct esterification reaction using terephthalic acid and excess ethylene glycol. This method includes reacting (i) a diacid component comprising terephthalic acid and (ii) a diol component comprising ethylene glycol to form polyethylene terephthalate precursors. This latter reaction achieves polyethylene terephthalate precursors having an average degree of polymerization between about 2 and 10, preferably between about 3 and 6.

Thereupon, the polyethylene terephthalate precursors are reacted with pre-esterified aromatic heterocyclic imide to yield imide-modified polyethylene terephthalate precursors. The imide-modified polyethylene terephthalate precursors are then polymerized via melt phase polycondensation to form imide-modified polyethylene terephthalate polymers.

As noted previously, it has been observed that the imide-modified polyethylene terephthalate polymers exhibit considerably improved color when esterified cyclic imide is introduced late into polyethylene terephthalate precursors (i.e., after the initiation of the esterification reaction between the diacid component and the diol component.)

With respect to continuous polyester processes, the esterified cyclic imide is typically introduced into polyethylene terephthalate precursors during esterification, though it can be introduced after esterification as well. With respect to batch processes, the esterified cyclic imide is usually introduced into polyethylene terephthalate precursors after esterification.

Those having skill in the polymer arts will appreciate that the direct esterification reaction using terephthalic acid and excess ethylene glycol begins under extremely acidic conditions. Such acidic conditions can cause aromatic heterocyclic imides to undergo ring-opening reactions.

Therefore, it is preferred that the introduction of the esterified cyclic imide into the polyethylene terephthalate precursors be delayed until the polyethylene terephthalate precursors have a carboxyl end group concentration of less than about 500 microequivalents per gram, more preferably less than about 400 microequivalents per gram. In other words, at the time the pre-esterified imide is introduced to the esterification reaction, the carboxyl end group concentration of the esterification reaction is less than about 500 microequivalents per gram.

Those having ordinary skill in the art will understand that the two-step ester exchange reaction between dimethyl terephthalate and excess ethylene glycol is less acidic than the direct esterification reaction between terephthalic acid and excess ethylene glycol. Consequently, when employing the former process, the esterified heterocyclic imides may be introduced at the start of the transesterification reaction—thereafter—without unduly promoting ring-opening reactions.

Regardless of the method of forming the polyethylene terephthalate precursors, the reaction between the esterified cyclic imide and the polyethylene terephthalate precursors typically proceeds at less than about 270° C. (e.g., between about 255° C. and 265° C.).

As one alternative to the foregoing polyester processes, non-esterified aromatic heterocyclic imide monomer is introduced into polyethylene terephthalate precursors during esterification, but after the initiation of esterification. For example, aromatic heterocyclic imide monomer can be introduced in slurried or dry form to the polyethylene terephthalate precursors during atmospheric esterification. This first alternative technique may be especially applicable for continuous, direct esterification processes, which employ terephthalic acid and excess ethylene glycol.

Similarly, in another alternative, non-esterified aromatic heterocyclic imide monomer is introduced into polyethylene terephthalate precursors after the completion of esterification. For example, aromatic heterocyclic imide monomer can be introduced in slurried or dry form to the polyethylene terephthalate precursors just prior to the start of polycondensation. This second alternative technique may be especially applicable for either batch or semi-continuous, direct esterification processes that employ terephthalic acid and excess ethylene glycol.

In yet another alternative, non-esterified aromatic heterocyclic imide monomer is introduced into polyethylene terephthalate precursors after the initiation of transesterification, especially after the completion of transesterification. For example, aromatic heterocyclic imide monomer can be introduced in slurried or dry form to the polyethylene terephthalate precursors just prior to the start of polycondensation. This third alternative technique may be especially applicable for either batch or semi-continuous, two-step ester exchange processes that employ dimethyl terephthalate and excess ethylene glycol.

In a typical, exemplary process, the continuous feed enters a direct esterification vessel that is operated at a temperature of between about 240° C. and 290° C. and at a pressure of between about 5 and 85 psia for between about one and five hours. The esterification reaction forms polyethylene terephthalate precursors having an average degree of polymerization of between about 4 and 6, as well as water. The water is removed as the reaction proceeds to drive favorable reaction equilibrium.

The polyethylene terephthalate precursors are then reacted with a pre-esterified aromatic heterocyclic imide at between about 255° C. and 265° C. to yield imide-modified polyethylene terephthalate precursors. In keeping with the prior discussion, the introduction of the pre-esterified cyclic imide is delayed until the carboxyl end group concentration of the esterification reaction is less than about 400 microequivalents per gram.

Thereafter, the imide-modified polyethylene terephthalate precursors are polymerized via melt phase polycondensation to form imide-modified polyethylene terephthalate polymers. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr.

In particular, the imide-modified polyethylene terephthalate precursors polycondense to form imide-modified polyethylene terephthalate polymers and ethylene glycol. The ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, typically referred to as the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol. The residence time in the polymerization vessels and the feed rate of the ethylene glycol and terephthalic acid into the continuous process is determined, in part, based on the target molecular weight of the imide-modified polyethylene terephthalate polymers. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels. In this regard, the melt phase polymerization generally continues until the polyethylene terephthalate possesses an intrinsic viscosity of at least about 0.5 dl/g (e.g., 0.6 dl/g).

Note that in addition to the formation of imide-modified polyethylene terephthalate polymers, side reactions occur that produce undesirable byproducts. For example, the esterification of ethylene glycol forms diethylene glycol, which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these byproducts.

After exiting the polycondensation stage, usually from the high polymerizer, the polymer melt is generally filtered and extruded. After extrusion, the imide-modified polyethylene terephthalate is quenched, preferably by spraying with water, to solidify it. The solidified imide-modified polyethylene terephthalate is cut into chips or pellets for storage and handling purposes. The polyester pellets preferably have an average mass of about 15–20 mg. As used herein, the term "pellets" is used generally to refer to chips, pellets, and the like.

In some circumstances, the pellets formed from the imide-modified polyethylene terephthalate polymers can be subjected to crystallization. Thereafter, the imide-modified polyethylene terephthalate polymers can be further polymerized in the solid state to increase molecular weight, typically to an intrinsic viscosity of at least about 0.7 dl/g (e.g., 0.8 dl/g or 0.9 dl/g). These subsequent steps, however, are constrained by the degree of imide modification. As a practical matter, high levels of comonomer substitution preclude subsequent crystallization and solid state polymerization.

Those having ordinary skill in the art will appreciate, however, that during subsequent polymer processing operations (e.g., injection molding of preforms), polyethylene terephthalate copolyesters may lose intrinsic viscosity. The imide-modified polyethylene terephthalate polymers of the present invention are no different in this regard. From chip to preform such intrinsic viscosity loss is typically between about 0.02 dl/g and 0.06 dl/g.

Although the prior exemplary discussion relates to a continuous production process, it will be understood that the invention is not so limited. The teachings disclosed herein may be applied to semi-continuous processes and even batch processes.

As noted, the imide-modified polyester resins according to the present invention possess increased glass transition temperatures. This makes these polyesters acceptable substitutes for polycarbonate and PMMA in a variety of applications.

The inclusion of aromatic heterocyclic imides in polyester increases glass transition temperature ($T_G$) of the resulting copolyester. Whereas homopolymer polyethylene terephthalate possesses a glass transition temperature ($T_G$) of about 78° C., the imide-modified polyethylene terephthalate polymers according to the present invention possess a glass transition temperature ($T_G$) of greater than about 80° C., and preferably greater than about 90° C. (e.g., 100° C. or more), as measured by differential scanning calorimetry at a heating rate of 10° C. per minute.

For example, modifying polyethylene terephthalate with 20 mole percent HETI yields a glass transition temperature ($T_G$) of about 93° C. and modifying polyethylene terephthalate with 30 mole percent HETI yields a glass transition temperature ($T_G$) of about 100° C. Moreover, modifying polyethylene terephthalate with 65 mole percent HETI is expected to yield a glass transition temperature ($T_G$) of about 126° C. and modifying polyethylene terephthalate with 80 mole percent HETI is expected to yield a glass transition temperature ($T_G$) of about 143° C.

As discussed previously, the imide-modified polyethylene terephthalate polymers typically include between about 2 and 30 mole percent imide comonomer substitution, yet may include less than about 5 mole percent non-imide comonomer substitution.

In one embodiment, the imide-modified polyester resins are re-melted and re-extruded to form preforms, which can thereafter be formed into polyester containers (e.g., beverage bottles).

In a first preferred embodiment, the container is a high-clarity, hot-fill bottle having an intrinsic viscosity of less than about 0.86 dl/g, such as between about 0.72 dl/g and 0.84 dl/g). More typically, the polyethylene terephthalate has an intrinsic viscosity of more than about 0.68 dl/g or less than about 0.80 dl/g, or both (i.e., between about 0.68 dl/g and 0.80 dl/g). With respect to preforms that are used to make hot-fill bottles, heat-setting performance diminishes at higher intrinsic viscosity levels and mechanical properties (e.g., stress cracking, drop impact, and creep) decrease at lower intrinsic viscosity levels (e.g., less than 0.6 dl/g).

In a second preferred embodiment, the container is a high-clarity, carbonated soft drink bottle having an intrinsic viscosity of more than about 0.72 dl/g or less than about 0.84 dl/g, or both (i.e., between about 0.72 dl/g and 0.84 dl/g). The carbonated soft drink bottle according to the present invention is capable of withstanding internal pressures of about 60 psig.

When used for preforms and bottles, the imide-modified polyester resins can include additional comonomer substitution (i.e., non-imide modification in addition to the imide modification). In this regard, isophthalic acid and diethylene glycol are the preferred modifiers. Cyclohexane dimethanol (CHDM) efficiently suppresses polymer crystallinity and especially improves impact resistance, but has poor oxygen and carbon dioxide barrier properties (i.e., high permeability).

Moreover, when used for preforms and bottles, the imide-modified polyester resins preferably include a heat-up rate additive, which promotes the absorption of energy during preform reheating processes. See, e.g., commonly assigned U.S. patent application Ser. No. 10/850,918, for Slow-Crystallizing Polyester Resins, filed May 21, 2004, and Ser. No. 10/996,789, for Polyester Preforms Useful For Enhanced Heat-Set Bottles, filed Nov. 24, 2004.

Polyethylene terephthalate is typically converted into a container via a two-step process. First, an amorphous bottle preform (e.g., less than about four percent crystallinity) is produced by melting bottle resin in an extruder and injection molding the molten polyester into a preform. Such a preform usually has an outside surface area that is at least an order of magnitude smaller than the outside surface of the final container. The preform is reheated by passing the preforms through a reheat oven of a blow molding machine. The reheat oven may consist of a bank of quartz lamps (3,000 and 2,500 watt lamps) that emits radiation mostly in the infrared range.

The reheated preform is then placed into a bottle blow mold and, by stretching and inflating with high-pressure air, formed into a heated bottle. The blow mold is maintained at a temperature between about 115° C. and 200° C., usually between about 120° C. and 160° C.

Those having ordinary skill in the art will understand that the introduction of compressed air into the heated preform effects formation of the heated bottle. Thus, in one variation, the compressed air is turbulently released from the bottle by the balayage technique to facilitate cooling of the heated bottle.

Those of ordinary skill in the art will further understand that any defect in the preform is typically transferred to the bottle. Accordingly, the quality of the bottle resin used to form injection-molded preforms is critical to achieving commercially acceptable bottles. Aspects of injection-molding preforms and stretch-blow molding bottles are discussed in U.S. Pat. No. 6,309,718 for Large Polyester Containers and Method for Making the Same, which is hereby incorporated entirely herein by reference.

In polyethylene terephthalate bottle production, the ability of the preform to absorb radiation and convert it into heat is critical to efficient bottle production and optimum bottle performance (e.g., material distribution, orientation, and sidewall crystallinity).

Preform reheat temperature is important for optimal bottle performance. Though it varies depending on the application (e.g., hot-filled beverage bottle or carbonated soft drink bottles), reheat temperature is typically in the range of 30–50° C. above the glass transition temperature ($T_G$).

Furthermore, the rate at which a preform can be reheated to the orientation temperature is important for optimal bottle performance in high-speed, polyethylene terephthalate blow-molding machines, such as those manufactured by Sidel, Inc. (LeHavre, France). This is especially true for heat-set bottles that are intended for filling with hot liquids in excess of 185° F. In heat-set bottle production, the preform is reheated rapidly to as high a temperature as possible. This maximizes crystallization upon blow molding and avoids thermal crystallization in the preform. Those having ordinary skill in the art will appreciate that such thermal crystallization can cause unacceptable haze as a result of spherulitic crystallization.

In general, higher comonomer substitution disrupts crystallization, thereby improving clarity and impact resistance. Most modifiers, however, reduce glass transition temperature ($T_G$), and so heat-setting is enhanced at lower comonomer substitution (e.g., less than about 2 mole percent comonomer substitution).

In another embodiment, the imide-modified polyester resins are formed into unoriented films. In a related embodiment, the polyester resins are formed into either uniaxially oriented film or biaxially oriented film.

In yet another embodiment, the imide-modified polyester resins are formed into sheets, either unoriented or oriented. When modified with UV blockers, such sheets are especially durable despite prolonged exposure to sunlight.

In yet another embodiment, the imide-modified polyester resins are injection molded into articles. When intended for injection molding, the imide-modified polyester resins can be modified with fillers (e.g., glass or minerals) to provide an engineering resin. Alternatively, the imide-modified polyester resins are suitable for use as unfilled engineering resin.

In yet another embodiment, the imide-modified polyester resins are formed into CDs or DVDs.

In still other embodiments, the imide-modified polyester resins are formed into fibers, which possess heat-bearing capability. Such fibers may be further formed into textile materials and products, such as yarns and fabrics. With respect to these embodiments, the imide-modified polyester resins are usually polymerized only in the melt phase (i.e., the resins usually do not undergo solid state polymerization) and so typically possess an intrinsic viscosity of between about 0.50 dl/g and 0.70 dl/g, and preferably between about 0.60 dl/g and 0.65 dl/g (e.g., 0.62 dl/g). Moreover, when used for fibers, the imide-modified polyester resins do not require additional comonomer substitution.

The foregoing discussion of the invention emphasizes imide-modified polyethylene terephthalate resins. It is believed, however, that the methods of preparing and introducing esterified cyclic imides have application not only to other polyesters (e.g., polytrimethylene terephthalate or polybutylene terephthalate), but also to any condensation polymer that possesses carbonyl functionality along its polymer chain. Suitable non-polyester condensation polymers according to the present invention include, without limitation, polyurethanes, polycarbonates, and polyamides.

Therefore, in yet another aspect, the invention embraces imide-modified resins that comprise condensation polymers having carbonyl functionality. Such imide-modified condensation polymer resins possess excellent thermal stability, impact resistance, and barrier properties.

As used herein, the term "carbonyl functionality" refers to a carbon-oxygen double bond that is an available reaction site. Condensation polymers having carbonyl functionality are typically characterized by the presence of a carbonyl functional group (i.e., C=O) with at least one adjacent hetero atom (e.g., an oxygen atom, a nitrogen atom, or a sulfur atom) functioning as a linkage within the polymer chain. Accordingly, "carbonyl functionality" is meant to embrace various functional groups including, without limitation, esters, amides, imides, carbonates, and urethanes.

As will be understood by those of ordinary skill in the art, oligomeric precursors to condensation polymers may be formed by reacting a first polyfunctional component and a second polyfunctional component. For example, oligomeric precursors to polycarbonates may be formed by reacting diols and derivatives of carbonic acid, oligomeric precursors to polyurethanes may be formed by reacting diisocyanates and diols, oligomeric precursors to polyamides may be formed by diacids and diamines, and oligomeric precursors to polyimides may be formed by reacting dianhydrides and diamines. See, e.g., Odian, *Principles of Polymerization*, (Second Edition 1981). These kinds of reactions are well understood by those of ordinary skill in the polymer arts and will not be further discussed herein.

For example, aliphatic polyamides (e.g., nylon-6 or nylon-6,6) generally possess lower glass transition temperatures as compared with polyesters. It is believed that reacting aromatic heterocyclic imide with diamine would yield a suitable cyclic imide-amide (i.e., pre-amidation or pre-amination). The cyclic imide-amide (i.e., a pre-aminated imide) could then be introduced into oligomeric precursors to polyamides to thereby yield an imide-modified nylon possessing an elevated glass transition temperature.

Alternatively, the cyclic imide-amide could be introduced into polyethylene terephthalate precursors to yield an imide-amide copolyester.

It will be further understood by those having ordinary skill in the art that certain monomers possessing multi-functionality can self-polymerize to yield condensation polymers. For example, amino acids and nylon salts are each capable of self-polymerizing into polyamides, and hydroxy acids (e.g., lactic acid) can self-polymerize into polyesters (e.g., polylactic acid).

Those having ordinary skill in the polymer arts will recognize that there are numerous kinds of imide-modified condensation polymers that can be synthesized without departing from the scope and spirit of the present invention. Accordingly, it is expected that the foregoing description of the invention using the preferred condensation polymer (i.e., polyethylene terephthalate) will enable those skilled in the polymer arts to practice, without undue experimentation, the invention for any condensation polymer having carbonyl functionality.

COMPARATIVE EXAMPLE 1

One kilogram batches of a PET homopolymer control and a five mole percent copolymer of hydroxyethyl trimellitimide (HETI) (i.e., Batch 1 and Batch 2, respectively) were prepared in a two-liter batch reactor. The total mole ratio of diol to diacid was 1.15. Monomer levels as charged to the start of each batch were as follows:

Batch 1 (control homopolymer)=864.5 grams terephthalic acid (TA) and 371.4 grams monoethylene glycol (MEG).

Batch 2 (copolyester imide made from initially charged imide monomer)=59.3 grams HETI, 817.2 grams terephthalic acid (TA), and 352.3 grams monoethylene glycol (MEG).

Catalysts consisting of 300 ppm antimony oxide and 127 ppm cobalt acetate tetrahydrate were added to the initial charge of each batch. Tetramethylammonium hydroxide was added at 50 ppm to suppress diethylene glycol (DEG) generation. The monomers were esterified at about 250° C. and 40 psig for two hours with removal of water from the top of a packed distillation column. The pressure was then reduced to atmospheric for the completion of esterification (i.e., one hour at 260° C.) during which time a drop in column top temperature indicated the completion of esterification.

After esterification, the product was subjected to a vacuum applied gradually over one hour to achieve a final vacuum of less than 1.0 mm Hg. Melt temperature was maintained between 260–265° C. during the vacuum let-down sequence. Polymerization temperature was increased and maintained at about 290° C. at less than 1.0 mm Hg vacuum. These conditions achieved a target melt viscosity. In this regard, melt viscosity was determined via the increase in operating current required for a motor drive to maintain a constant RPM agitator speed.

The Batch 1 and Batch 2 polymers were tested for intrinsic viscosity (IV), mole percent DEG, and color using a HunterLab LabScan XE spectrophotometer. Bulk polymer thermal properties were measured by modulated differential scanning calorimetry. Glass transition temperature ($T_G$), heating crystallization temperature ($T_{CH}$), and crystalline melting peak temperature ($T_M$) were determined from second cycle scans (i.e., after heating to melt and rapidly quenching). Cooling crystallization below the melt ($T_{CC}$) was determined at cooling rates of 5° C./min, 10° C./min, and 20° C./min, respectively. Data summarized in Table 1 (below).

EXAMPLE 2

Additional 0.95 kilogram batches of a five mole percent copolymer of hydroxyethyl trimellitimide (HETI) (i.e., Batch 3 and Batch 4) were prepared in a two-liter batch reactor.

In particular, the Batch 3 copolymer and the Batch 4 copolymer were prepared by introducing a non-esterified hydroxyethyl trimellitimide (HETI) solution after the completion of esterification. The HETI solution was prepared by dissolving, at 150–200° C., a 1:1 mole ratio of HETI monomer in monoethylene glycol (MEG) for about one hour under nitrogen.

Batches 3 and 4 differed in that the Batch 3 copolymer was melt polymerized at about 290° C. and the Batch 4 copolymer was melt polymerized at about 280° C.

TABLE 1

| | | mol % | LabScan XE Color | | | mDSC (° C.) | | | $T_{CC}$ (° C.) | | |
|---|---|---|---|---|---|---|---|---|---|---|---|
| | IV | DEG | HL | HA | HB | $T_G$ | $T_{CH}$ | $T_M$ | 5° C./min | 10° C./min | 20° C./min |
| Batch 1 (control homopolymer) | 0.634 | 2.91 | 83.56 | 0.76 | 1.14 | 79.3 | 125.0 | 255.6 | 199.3 | 190.5 | 174.9 |
| Batch 2 (5 mol % HETI copolymer) | 0.592 | 2.49 | 76.98 | 1.85 | 19.38 | 83.3 | 138.8 | 246.2 | 178.2 | 168.1 | 154.8 |

The Batch 2 copolymer was significantly more yellow and dark relative to the Batch 1 control homopolymer. This is indicated by the amorphous b* (HB) and amorphous L* (HL) data, respectively. The Batch 2 copolyester's inclusion of HETI monomer slowed the onset of crystallization (as indicated by its increased $T_{CH}$ and decreased $T_{CC}$), yet the Batch 2 copolymer was semi-crystalline rather than amorphous.

Moreover, as compared with the Batch 1 control homopolymer, the Batch 2 copolyester's inclusion of the HETI monomer also increased the glass transition temperature ($T_G$) of the Batch 2 copolymer by 4° C.

Although the Batch 2 copolymer was polymerized to the same final melt viscosity as the Batch 1 control homopolymer, the Batch 2 copolymer's intrinsic viscosity decreased. In this regard, intrinsic viscosity is directly correlated to polymer molecular weight. The reduction in intrinsic viscosity, or molecular weight, in the Batch 2 copolymer indicated that some degree of polymer chain branching was present because structurally branched polyester typically exhibits a higher melt viscosity than linear polyester. Experience using varying levels of branching agents (e.g., pentaerythritol) to control the relationship between intrinsic viscosity and melt viscosity further supports the conclusion that branching was present in the Batch 2 copolyester. In short, increased branching agent levels yield increased melt viscosities even at somewhat lower intrinsic viscosities.

Without being bound to any particular theory, it is thought that the observed drop in the Batch 2 copolyester's intrinsic viscosity was caused by the presence of trifunctional species, which formed during esterification via an acid-promoted ring opening of the trimellitimide structure. In this regard, it is further believed that the high degree of yellowness possessed by the Batch 2 copolyester was related to the addition of HETI monomer at the beginning of the esterification process.

As in Comparative Example 1, the total mole ratio of diol to diacid used to prepare Batches 3 and 4 was 1.15. Monomer levels as charged to the start of each batch were as follows:

Batch 3 (copolyester imide made from imide monomer solution added after PET process esterification)=776.3 grams terephthalic acid (TA) and 319.0 grams monoethylene glycol (MEG).

Batch 4 (copolyester imide made from imide monomer solution added after PET process esterification)=776.3 grams terephthalic acid (TA) and 319.0 grams monoethylene glycol (MEG).

Catalysts consisting of 300 ppm antimony oxide and 127 ppm cobalt acetate tetrahydrate were added to the initial charge of each batch. Tetramethylammonium hydroxide was added at 50 ppm to suppress diethylene glycol (DEG) generation. The TA and MEG were esterified under 40 psig pressure and a temperature of about 250° C. for two hours with removal of water from the top of a packed distillation column. The pressure was then reduced to atmospheric for the completion of esterification for one hour at about 260° C., during which time a drop in column top temperature indicated completion of esterification.

After the end of esterification, 56.7 grams of HETI monomer (dissolved in 16 grams of MEG to facilitate its introduction) was charged to each batch. The HETI monomer was heated to about 190° C. prior to addition to the polymerization process to minimize loss of temperature in the polymer process. The product was then subjected to a vacuum applied gradually over one hour to achieve a final vacuum of less than 1 mm Hg. Melt temperature was maintained between 260–265° C. during the vacuum let-down sequence.

For the Batch 3 copolymers, polymerization temperature was increased and maintained at about 290° C. at less than 1 mm Hg vacuum.

For the Batch 4 copolymers, polymerization temperature was increased and maintained at about 280° C. at less than 1 mm Hg vacuum.

For both Batches 3 and 4 polymerization continued until the target melt viscosity was achieved. As noted, melt viscosity was determined via the increase in operating current required for a motor drive to maintain a constant RPM agitator speed.

The Batch 3 and Batch 4 copolymers were tested for intrinsic viscosity, mole percent DEG, and color using a HunterLab LabScan XE spectrophotometer. Bulk polymer thermal properties were measured by modulated differential scanning calorimetry. Glass transition temperature ($T_G$), heating crystallization temperature ($T_{CH}$) and crystalline melting peak temperature ($T_M$) were determined from second cycle scans (after heating to melt and rapidly quenching). Cooling crystallization below the melt ($T_{CC}$) was determined at cooling rate of 10° C./min. Data are summarized in Table 2 (below).

tures. Indeed, the Batch 4 copolymer, which was melt polymerized at 280° C., achieved slightly improved color over the Batch 3 copolymer, which was polymerized at 290° C.

Moreover, and without being bound to any one theory, it is believed that, as compared with the Batch 2 copolymer, the reduced yellowness possessed by the Batch 4 copolymer was related not only to the post-esterification introduction of the HETI, but also to decreasing the melt polymerization temperature by 10° C.

In this regard, it has been observed that, all things otherwise being the same, reducing the melt phase polymerization temperature from about 290° C. to about 280° C. reduces amorphous b* color value in the resulting copolyester imide product by about 2 units.

Finally, as compared with the Batch 1 control homopolymer, the Batch 4 copolyester's inclusion of HETI monomer increased glass transition temperature ($T_G$) and slowed the onset of crystallization (as indicated by the increased $T_{CH}$

TABLE 2

| | | mol % | LabScan XE Color | | | mDSC (° C.) | | | $T_{CC}$ (° C.) |
|---|---|---|---|---|---|---|---|---|---|
| | IV | DEG | HL | HA | HB | $T_G$ | $T_{CH}$ | $T_M$ | 10° C./min |
| Batch 3 (5 mol % HETI copolymer - HETI added post-esterification - copolymer polymerized at 290° C.) | 0.62 | 2.92 | 80.10 | 0.51 | 6.22 | 83.2 | 135.2 | 247.2 | 172.2 |
| Batch 4 (5 mol % HETI copolymer - HETI added post-esterification - copolymer polymerized at 280° C.) | 0.62 | 2.90 | 80.56 | 0.60 | 4.36 | 83.4 | 141.0 | 247.0 | 164.5 |

The Batch 3 copolymer was polymerized to about the same final melt viscosity as the Batch 2 copolymer of Comparative Example 1, yet exhibited somewhat higher intrinsic viscosity.

Without being bound to any one theory, it is believed that the improved intrinsic viscosity of the Batch 3 copolymer indicates reduced chain branching. In this regard, it is thought that greater intrinsic viscosity was achieved by delaying the HETI addition until a milder, less acidic point in the polyester process (i.e., after completion of esterification). Delaying the introduction of the HETI monomer until the completion of esterification would seem to result in less acid-promoted ring opening of the trimellitimide structure. Consequently, it appears that less chain branching occurred in polymerizing the Batch 3 copolyester.

Moreover, as compared with the Batch 2 copolymer, the Batch 3 copolymer less dark (i.e., increased amorphous L*) and substantially less yellow (i.e., decreased amorphous b*). Without being bound to any theory, it is believed that, as compared with the Batch 2 copolymer, the Batch 3 copolymer's significant reduction in yellow coloration was a result of delaying the addition of HETI until the completion of esterification.

Furthermore, as compared with the Batch 1 control homopolymer, the Batch 3 copolyester's inclusion of HETI monomer increased glass transition temperature ($T_G$) and slowed the onset of crystallization (as indicated by the increased $T_{CH}$ and decreased $T_{CC}$).

Comparing the Example 2 copolyesters (i.e., Batch 3 and Batch 4) suggests that improved color can be achieved by carrying out melt phase polymerization at reduced temperaand decreased $T_{CC}$). In this respect, the copolyesters of Batches 2–4 exhibited similar thermal characteristics.

EXAMPLE 3

Yet another one kilogram batch of a five mole percent copolymer of hydroxyethyl trimellitimide (HETI) (i.e., Batch 5) was prepared in a two-liter batch reactor. In particular, the HETI was added to the batch as a pre-esterified oligomeric mixture after the completion of esterification.

The HETI ester oligomer mixture was made by preparing a slurry of HETI monomer in monoethylene glycol (MEG) at a 1.05 mole ratio of MEG to HETI and heating this slurry to 195–200° C. under nitrogen at atmospheric pressure. Water, an esterification product, was continually removed from a packed distillation column. The temperature decrease at the top of the distillation column indicated that esterification was complete. Thereafter, the clear, light yellow liquid product—an esterified cyclic imide—was used without further purification.

As in Comparative Example 1, the total mole ratio of diol to diacid used to prepare the copolyester imide product was 1.15. Monomer levels as charged to the start of the batch were as follows:

Batch 5 (copolyester imide made from pre-esterified imide monomer added after PET process esterification) =818.3 grams terephthalic acid (TA) and 336.3 grams monoethylene glycol (MEG).

Catalysts consisting of 300 ppm antimony oxide and 127 ppm cobalt acetate tetrahydrate were added to the initial charge of the batch. Tetramethylammonium hydroxide was added at 50 ppm to suppress diethylene glycol (DEG) generation. The TA and MEG were esterified under 40 psig pressure and a temperature of about 250° C. for two hours with removal of water from the top of a packed distillation column. The pressure was then reduced to atmospheric for the completion of esterification for one hour at about 260° C., during which time a drop in column top temperature indicated the completion of esterification.

After esterification, about 69 grams of the aforementioned HETI ester oligomer mixture was charged to the batch. The HETI ester oligomer mixture was heated to 190–200° C. prior to its addition to the polymerization process to minimize temperature loss in the polymer process.

The product was then subjected to a vacuum applied gradually over one hour to achieve a final vacuum of less than 1.0 mm Hg. Melt temperature was maintained between 260–265° C. during the vacuum letdown sequence. Polymerization temperature was increased and maintained at about 290° C. at less than 1 mm Hg vacuum to achieve a target melt viscosity. As noted, melt viscosity was determined via the operating current required for a motor drive to maintain a constant RPM agitator speed.

The Batch 5 copolymer was tested for intrinsic viscosity, mole percent DEG, and color using a HunterLab LabScan XE spectrophotometer. Bulk polymer thermal properties were measured by modulated differential scanning calorimetry. Glass transition temperature ($T_G$), heating crystallization temperature ($T_{CH}$), and crystalline melting peak temperature ($T_M$) were determined from second cycle scans (after heating to melt and rapidly quenching). Cooling crystallization below the melt ($T_{CC}$) was determined at cooling rate of 10° C./min. Data are summarized in Table 3 (below).

Without being bound to any one theory, it is believed that, as compared with the Batch 2 copolymer, the significant improvement in yellow coloration of the Batch 5 copolymer was related to (1) pre-esterifying the HETI to form an esterified cyclic imide (2) delaying the addition of the pre-esterified HETI until esterification was complete.

The Batch 5 copolyester also had improved barrier properties as compared with the Batch 1 homopolymer of Comparative Example 1. In particular, as compared with the Batch 1 control homopolymer, carbon dioxide barrier was seven percent better and oxygen barrier was ten percent better in the Batch 5 copolyester.

Finally, as compared with the Batch 1 control homopolymer, the Batch 5 copolyester's inclusion of pre-esterified HETI increased glass transition temperature ($T_G$) and slowed the onset of crystallization (as indicated by the increased $T_{CH}$ and decreased $T_{CC}$). In this respect, the copolyesters of Batches 2–5 exhibited similar thermal characteristics.

EXAMPLE 4

Example 2 indicates that further color improvement can be achieved by reducing the temperature of melt phase polymerization. Accordingly, yet another batch (i.e., Batch 6) of a five mole percent copolymer of hydroxyethyl trimellitimide (HETI) was prepared in accordance with Example 3, albeit with two significant differences.

First, in contrast to the HETI ester oligomer mixture of Batch 5, the HETI ester oligomer mixture of Batch 6 was made by preparing a slurry of HETI in a greater excess of monoethylene glycol (MEG) (i.e., increasing the mole ratio of MEG to HETI to 2:1). In addition, the liquid HETI ester oligomer mixture was further isolated to yield a solid

TABLE 3

| | | mol % | LabScan XE Color | | | mDSC (° C.) | | | $T_{CC}$ (° C.) |
|---|---|---|---|---|---|---|---|---|---|
| | IV | DEG | HL | HA | HB | $T_G$ | $T_{CH}$ | $T_M$ | 10° C./min |
| Batch 5 (5 mol % pre-esterified HETI - added post-esterification - copolymer polymerized at 290° C.) | 0.614 | 2.39 | 82.01 | 0.75 | 5.92 | 82.5 | 132.5 | 247.8 | 168.5 |

The Batch 5 copolymer of Example 3 was polymerized to about the same final melt viscosity as the Batch 2 copolymer of Comparative Example 1, yet it possessed greater intrinsic viscosity than did the Batch 2 copolymer. It is believed that this increased intrinsic viscosity indicates reduced chain branching.

Without being bound to any theory, greater intrinsic viscosity was achieved by pre-esterifying the HETI monomer and delaying its addition to a milder, less acidic condition in the polyester process (i.e., after the completion of esterification). As discussed previously, it is thought that delaying HETI addition reduced acid-promoted ring opening of the trimellitimide structure.

Moreover, the Batch 5 copolymer exhibited much less yellow color (i.e., reduced amorphous b* value) and was significantly less dark (i.e., increased amorphous L* value) as compared with the Batch 2 copolymer. As noted, the Batch 2 copolyester was made by introducing non-esterified HETI at the start of esterification.

esterified imide product that was purer than the liquid ester product employed in Example 3 (i.e., Batch 5). In particular, the solid esterified imide of Batch 6 was precipitated from the HETI ester oligomer mixture.

Second, like the Batch 5 copolymer of Example 3, the Batch 6 copolymer was a copolyester imide made from pre-esterified imide monomer that was introduced to the batch after esterification. Whereas the Batch 5 copolymer was polymerized at about 290° C., however, the Batch 6 copolymer was polymerized at about 280° C.

As in Comparative Example 1, the total mole ratio of diol to diacid used to prepare the copolyester imide product was 1.15. Monomer levels as charged to the start of the batch were as follows:

Batch 6 (copolyester imide made from pre-esterified imide monomer added after PET process esterification) =818.3 grams terephthalic acid (TA) and 336.3 grams monoethylene glycol (MEG).

Test data are summarized in Table 4 (below).

TABLE 4

| | | mol % | | LabScan XE Color | | | mDSC (° C.) | | | $T_{CC}$ (° C.) |
|---|---|---|---|---|---|---|---|---|---|---|
| | IV | DEG | HL | HA | HB | $T_G$ | $T_{CH}$ | $T_M$ | 10° C./min |
| Batch 6<br>(5 mol % pre-esterified HETI -<br>added post-esterification -<br>copolymer polymerized at 280° C.) | 0.61 | 2.83 | 79.90 | –1.06 | 0.90 | 82.9 | 138.6 | 248.2 | 175.5 |

Like Batches 2–5, Batch 6 exhibits similar thermal properties with respect to suppression of crystallization (as indicated by the increased $T_{CH}$ and decreased $T_{CC}$), increased glass transition temperature ($T_G$), and enhanced barrier properties. Without being bound to any theory, this suggests that it is the presence and concentration of the HETI—more than the timing of its introduction—that may be determinative with respect to these thermal properties.

The Batch 6 copolymer and the Batch 4 copolyester were each polymerized at the same melt temperature (i.e., 280° C.) to about the same final melt viscosity. Nonetheless, the Batch 6 copolymer, which was modified with pre-esterified HETI, possessed significantly better color than that of the Batch 4 copolymer, which was modified with non-esterified HETI.

Similarly, the intrinsic viscosities of the Batch 5 and Batch 6 copolymers were essentially the same. That notwithstanding, the Batch 6 copolymer, which was polymerized at 280° C., exhibited significantly reduced yellowness as compared with that possessed by the Batch 5 copolymer, which was polymerized at 290° C. Indeed, of Batches 1–6, the Batch 6 copolymer exhibited the least yellow coloration.

Accordingly, and without being bound to any one theory, it is believed that, as compared to the Batch 2 copolymer of Comparative Example 1, the superior reduction in yellow coloration in the Batch 6 copolymer was related to (1) the HETI pre-esterification, including its use of a purer form of the HETI ester; (2) the post-esterification addition of the HETI ester; and (3) the 10° C. reduction in melt polymerization temperature.

In particular, it is thought that using a purer pre-esterified imide eliminates undesirable color bodies, thereby facilitating the production of imide-modified polyethylene terephthalate polymers having outstanding color properties. As noted previously, it has been observed that employing an imide/diol molar ratio of at least about 1:2 (e.g., about 1:5 or 1:10), and thereafter isolating and purifying the esterified cyclic imide before introducing it into the polyethylene terephthalate precursors, brings about appreciably better color properties in the resulting imide-modified polyethylene terephthalate polymers.

In the specification, typical embodiments of the invention have been disclosed. Specific terms have been used only in a generic and descriptive sense, and not for purposes of limitation. The scope of the invention is set forth in the following claims.

The invention claimed is:

1. A method for making polyester resin, comprising:
   reacting a terephthalate component and a diol component to form polyethylene terephthalate precursors;
   after the initiation of the reaction between the terephthalate component and the diol component, introducing pre-esterified imide into the polyethylene terephthalate precursors to yield imide-modified polyethylene terephthalate precursors; and
   polymerizing the imide-modified polyethylene terephthalate precursors to form imide-modified polyethylene terephthalate polymers.

2. A method according to claim 1, wherein the step of reacting the terephthalate component and the diol component comprises reacting in an esterification reaction (i) a diacid component comprising terephthalic acid and (ii) a diol component comprising ethylene glycol to form polyethylene terephthalate precursors.

3. A method according to claim 1, wherein the step of reacting the terephthalate component and the diol component comprises reacting in a transesterification reaction (i) a diester component comprising dimethyl terephthalate and (ii) a diol component comprising ethylene glycol to form polyethylene terephthalate precursors.

4. A method according to claim 1, wherein each step is performed as a continuous process.

5. A method according to claim 1, wherein one or more steps are performed as a semi-continuous process.

6. A method according to claim 1, wherein one or more steps are performed as a batch process.

7. A method according to claim 1, wherein the step of reacting the terephthalate component and the diol component comprises reacting a terephthalate component and a diol component to form polyethylene terephthalate precursors that, prior to imide modification, have at least some comonomer substitution, but less than about 20 mole percent comonomer substitution.

8. A method according to claim 1, wherein the step of reacting the terephthalate component and the diol component comprises reacting a terephthalate component and a diol component to form polyethylene terephthalate precursors that, prior to imide modification, have between about 2 and 10 mole percent comonomer substitution.

9. A method according to claim 1, wherein:
   the terephthalate component comprises mostly terephthalic acid or dimethyl terephthalate, and further comprises at least one modifier selected from the group consisting of isophthalic acid, dimethyl isophthalate, phthalic acid, phthalic anhydride, 2,6-naphthalene dicarboxylic acid, dimethyl 2,6-naphthalene dicarboxylate, biphenyl dicarboxylic acid, cyclohexane dicarboxylic acid, anthracene dicarboxylic acid, adamantane 1,3-dicarboxylic acid, adipic acid, dimethyl adipate, succinic acid, dimethyl succinate, succinic anhydride, glutaric acid, sebacic acid, and azelaic acid; or
   the diol component comprises mostly ethylene glycol, and further comprises at least one modifier selected from the group consisting of diethylene glycol, polyalkylene glycols, 1,3-propane diol, 1,4-butane diol, 1,5-pentanediol, 1,6-hexanediol, propylene glycol, 1,4-cyclohexane dimethanol, neopentyl glycol, 2-methyl-1,3-propanediol, 2,2,4,4-tetramethyl-1,3-cyclobutanediol, adamantane-1,3-diol, 3,9-bis(1,1-dimethyl-2-hydroxyethyl)-2,4,8,10-tetraoxaspiro [5.5]undecane, and isosorbide.

10. A method according to claim 1, wherein the step of introducing pre-esterified imide into the polyethylene terephthalate precursors comprises introducing pre-esterified imide into polyethylene terephthalate precursors that have an average degree of polymerization between about 2 and 10.

11. A method according to claim 1, wherein the pre-esterified imide comprises a derivative of trimellitic acid, trimellitic anhydride, pyromellitic acid, pyromellitic dianhydride, benzophenone tetracarboxylic acid, benzophenone tetracarboxylic dianhydride, naphthalene tetracarboxylic acid, or naphthalene tetracarboxylic dianhydride, or mixtures thereof.

12. A method according to claim 1, wherein step of polymerizing the imide-modified polyethylene terephthalate precursors comprises polymerizing the imide-modified polyethylene terephthalate precursors via melt phase polycondensation.

13. A method according to claim 12, wherein the step of introducing pre-esterified imide into the polyethylene terephthalate precursors comprises introducing pre-esterified imide into the polyethylene terephthalate precursors just prior to melt phase polycondensation.

14. A method according to claim 1, wherein step of polymerizing the imide-modified polyethylene terephthalate precursors comprises polymerizing the imide-modified polyethylene terephthalate precursors via melt phase polycondensation to form imide-modified polyethylene terephthalate polymers having an intrinsic viscosity of at least about 0.5 dl/g, and thereafter solid state polymerizing the imide-modified polyethylene terephthalate polymers to an intrinsic viscosity of at least about 0.7 dl/g.

15. A method according to claim 1, wherein the imide-modified polyethylene terephthalate polymers include more than about 30 mole percent imide comonomer substitution.

16. A method according to claim 1, wherein the imide-modified polyethylene terephthalate polymers include between about 20 and 30 mole percent imide comonomer substitution.

17. A method according to claim 1, wherein imide-modified polyethylene terephthalate polymers include between about 10 and 20 mole percent imide comonomer substitution.

18. A method according to claim 1, wherein imide-modified polyethylene terephthalate polymers include between about 3 and 10 mole percent imide comonomer substitution.

19. A method according to claim 1, wherein the imide-modified polyethylene terephthalate polymers, as measured on a colorant-free basis, possess an amorphous b* color value of less than about 5 and an amorphous L* value of more than about 55 as classified by the CIE L*a*b* color space.

20. A method according to claim 19, wherein the imide-modified polyethylene terephthalate polymers, as measured on a colorant-free basis, possess an amorphous b* color value of less than about 3 as classified by the CIE L*a*b* color space.

21. A method according to claim 19, wherein the imide-modified polyethylene terephthalate polymers, as measured on a colorant-free basis, possess an amorphous L* value of more than about 70 as classified in the CIE L*a*b* color space.

22. A method according to claim 1, further comprising forming the imide-modified polyethylene terephthalate polymers into preforms, bottles, or other containers.

23. A method according to claim 1, further comprising forming the imide-modified polyethylene terephthalate polymers into films, sheets, fibers, or optical media.

24. A method according to claim 1, further comprising forming the imide-modified polyethylene terephthalate polymers into an article possessing a b* color value of less than about 6 and a L* value of more than about 55 as classified by the CIE L*a*b* color space and as measured upon a standard three-millimeter test plaque.

25. A method according to claim 1, wherein the pre-esterified imide comprises pre-esterified aromatic heterocyclic imide.

26. A method according to claim 1, wherein the pre-esterified imide comprises mostly pre-esterified hydroxyethyl trimellitimide (HETI).

27. A method according to claim 1, wherein the step of introducing pre-esterified imide into the polyethylene terephthalate precursors comprises initiating a reaction between the pre-esterified imide and the polyethylene terephthalate precursors when the polyethylene terephthalate precursors have a carboxyl end group concentration of less than about 500 microequivalents per gram.

28. A method according to claim 1, further comprising the step of reacting aromatic heterocyclic imide and polyol to form the pre-esterified imide.

29. A method according to claim 28, wherein the step of reacting aromatic heterocyclic imide and polyol comprises reacting, at about atmospheric pressure and less than about 200° C., aromatic heterocyclic imide monomer and polyol to form the pre-esterified imide.

30. A method according to claim 28, wherein the step of reacting aromatic heterocyclic imide and polyol comprises gradually introducing aromatic heterocyclic imide into excess polyol in a stoichiometric molar ratio of at least about 1.00:1.05.

31. A method according to claim 28, wherein the step of reacting aromatic heterocyclic imide and polyol comprises reacting aromatic heterocyclic imide monomer and excess polyol in a stoichiometric molar ratio of at least about 1:2.

32. A method according to claim 28, wherein the step of reacting aromatic heterocyclic imide and polyol comprises reacting aromatic heterocyclic imide monomer and polyol in an excess stoichiometric molar ratio of at least about 1:5, and thereafter isolating the pre-esterified imide.

33. A method according to claim 28, wherein the step of reacting aromatic heterocyclic imide and polyol comprises reacting aromatic heterocyclic imide with one or more polyols having the chemical formula R—(OH)$_n$, wherein R is a $C_2$–$C_{10}$ alkyl, a $C_6$–$C_{10}$ aryl, or a $C_8$–$C_{14}$ alkyl-substituted aryl, or a mixture thereof, and wherein n is 2, 3, or 4.

34. A method according to claim 28, wherein the step of reacting aromatic heterocyclic imide and polyol further comprises isolating the pre esterified imide.

35. A method according to claim 28, wherein:
the step of reacting aromatic heterocyclic imide and polyol to form pre-esterified imide comprises reacting hydroxyethyl trimellitimide (HETI) monomer with excess polyol; and
the step of polymerizing the imide-modified polyethylene terephthalate precursors comprises polymerizing the imide-modified polyethylene terephthalate precursors via melt phase polycondensation to form imide-modified polyethylene terephthalate polymers that, as measured on a colorant-free basis, possess an amorphous b* color value of less than about 6.

36. A method according to claim 28, wherein the imide-modified polyethylene terephthalate polymers have a glass transition temperature ($T_G$) of more than about 90° C.

37. A method for making polyester resin, comprising:
reacting in an esterification reaction (i) a diacid component comprising mostly terephthalic acid and (ii) a diol component comprising mostly ethylene glycol to form polyethylene terephthalate precursors;
introducing pre-esterified imide to the polyethylene terephthalate precursors; and
copolymerizing the polyethylene terephthalate precursors and the pre-esterified imide via melt phase polycondensation to form imide-modified polyethylene terephthalate polymers.

38. A method according to claim 25, wherein the polyethylene terephthalate precursors, prior to imide introduction, include between about 2 and 20 mole percent comonomer substitution.

39. A method according to claim 37, wherein the polyethylene terephthalate precursors, prior to imide introduction, include less than about 5 mole percent comonomer substitution.

40. A method according to claim 37, wherein the pre-esterified imide is introduced to the polyethylene terephthalate precursors during the esterification reaction.

41. A method according to claim 37, wherein the pre-esterified imide is introduced to the polyethylene terephthalate precursors after the esterification reaction.

42. A method according to claim 37, wherein the step of introducing pre-esterified imide to the polyethylene terephthalate precursors comprises introducing pre-esterified imide to polyethylene terephthalate precursors when the polyethylene terephthalate precursors have a carboxyl end group concentration of less than about 400 microequivalents per gram.

43. A method according to claim 37, wherein the step of introducing pre-esterified imide to the polyethylene terephthalate precursors comprises introducing pre-esterified imide to polyethylene terephthalate precursors having an average degree of polymerization between about 2 and 10.

44. A method according to claim 37, wherein the step of introducing pre-esterified imide to the polyethylene terephthalate precursors comprises introducing pre-esterified imide to polyethylene terephthalate precursors having an average degree of polymerization between about 3 and 6.

45. A method according to claim 37, wherein the step of introducing pre-esterified imide to the polyethylene terephthalate precursors comprises reacting pre-esterified imide and polyethylene terephthalate precursors at less than about 270° C.

46. A method according to claim 37, wherein the pre-esterified imide comprises pre-esterified aromatic heterocyclic imide.

47. A method according to claim 37, wherein the pre-esterified imide comprises a derivative of trimellitic acid, trimellitic anhydride, pyromellitic acid, pyromellitic dianhydride, benzophenone tetracarboxylic acid, benzophenone tetracarboxylic dianhydride, naphthalene tetracarboxylic acid, or naphthalene tetracarboxylic dianhydride, or mixtures thereof.

48. A method according to claim 37, wherein the pre-esterified imide comprises mostly pre-esterified hydroxyethyl trimellitimide (HETI).

49. A method according to claim 37, wherein imide-modified polyethylene terephthalate polymers include more than about 2 mole percent imide comonomer substitution.

50. A method according to claim 37, wherein imide-modified polyethylene terephthalate polymers include between about 15 and 30 mole percent imide comonomer substitution.

51. A method according to claim 37, wherein imide-modified polyethylene terephthalate polymers include between about 5 and 15 mole percent imide comonomer substitution.

52. A method according to claim 37, further comprising solid state polymerizing the imide-modified polyethylene terephthalate polymers.

53. A method according to claim 37, further comprising forming the imide-modified polyethylene terephthalate polymers into preforms, containers, bottles, sheets, films, fibers, optical media, injection molded parts, or other articles.

54. A method according to claim 37, further comprising the step of reacting aromatic heterocyclic imide and excess polyol to form the pre-esterified imide.

55. A method according to claim 54, wherein the step of reacting aromatic heterocyclic imide and excess polyol further comprises isolating the pre-esterified imide.

56. A method according to claim 54, wherein the imide-modified polyethylene terephthalate polymers have a glass transition temperature ($T_G$) of more than about 85° C.

57. A method for making polyester resin, comprising:
reacting in a transesterification reaction (i) a diester component comprising mostly dimethyl terephthalate and (ii) a diol component comprising mostly ethylene glycol to form polyethylene terephthalate precursors;
introducing pre-esterified imide to the polyethylene terephthalate precursors; and
copolymerizing the polyethylene terephthalate precursors and the pre-esterified imide via melt phase polycondensation to form imide-modified polyethylene terephthalate polymers.

58. A method according to claim 57, wherein the polyethylene terephthalate precursors, prior to imide introduction, include less than about 10 mole percent comonomer substitution.

59. A method according to claim 57, wherein the pre-esterified imide comprises pre-esterified aromatic heterocyclic imide.

60. A method according to claim 57, wherein imide-modified polyethylene terephthalate polymers include more than about 2 mole percent imide comonomer substitution.

61. A method according to claim 57, wherein imide-modified polyethylene terephthalate polymers include between about 15 and 30 mole percent imide comonomer substitution.

62. A method according to claim 57, wherein imide-modified polyethylene terephthalate polymers include between about 5 and 15 mole percent imide comonomer substitution.

63. A method according to claim 57, further comprising solid state polymerizing the imide-modified polyethylene terephthalate polymers.

64. A method according to claim 57, further comprising forming the imide-modified polyethylene terephthalate polymers into preforms, containers, bottles, sheets, films, fibers, optical media, injection molded parts, or other articles.

65. A method according to claim 57, wherein the pre-esterified imide is introduced to the polyethylene terephthalate precursors after the completion of transesterification.

66. A method according to claim 57, further comprising the step of reacting aromatic heterocyclic imide and excess polyol to form the pre-esterified imide.

67. A method for making polyester resin, comprising:
initiating a reaction between a terephthalate component and a diol component;
introducing pre-esterified imide to the reaction between the terephthalate component and the diol component to thereby effect the formation of imide-modified polyethylene terephthalate precursors; and
polymerizing the imide-modified polyethylene terephthalate precursors via polycondensation to form imide-modified polyethylene terephthalate polymers.

68. A method according to claim 67, wherein the step of initiating a reaction between a terephthalate component and a diol component comprises reacting in an esterification reaction a diacid component that comprises terephthalic acid and a diol component that comprises ethylene glycol to form monomers and oligomers of (i) terephthalic acid and, optionally, diacid modifiers, and (ii) ethylene glycol and, optionally, diol modifiers.

69. A method according to claim 68, wherein, at the time the pre-esterified imide is introduced to the esterification reaction, the carboxyl end group concentration of the esterification reaction is less than about 500 microequivalents per gram.

70. A method according to claim 67, wherein the step of initiating a reaction between a terephthalate component and a diol component comprises reacting in a transesterification reaction a diester component that comprises dimethyl terephthalate and a diol component that comprises ethylene glycol to form monomers of (i) dimethyl terephthalate and, optionally, diester modifiers, and (ii) ethylene glycol and, optionally, diol modifiers.

71. A method according to claim 67, wherein the pre-esterified imide is introduced at the initiation of the reaction between the terephthalate component and the diol component.

72. A method according to claim 67, wherein the pre-esterified imide is introduced after the initiation of the reaction between the terephthalate component and the diol component.

73. A method according to claim 67, further comprising forming the pre-esterified imide by reacting aromatic heterocyclic imide and excess polyol, and thereafter isolating the pre-esterified imide.

74. A method according to claim 67, wherein the imide-modified polyethylene terephthalate polymers have a glass transition temperature ($T_G$) of more than about 80° C.

75. A method according to claim 67, wherein the imide-modified polyethylene terephthalate polymers have a glass transition temperature ($T_G$) of more than about 95° C.

* * * * *